F. T. FLINCHBAUGH.
STEERING GEAR FOR TRACTION ENGINES.
APPLICATION FILED SEPT. 28, 1908.
920,125.
Patented May 4, 1909.
2 SHEETS—SHEET 1.
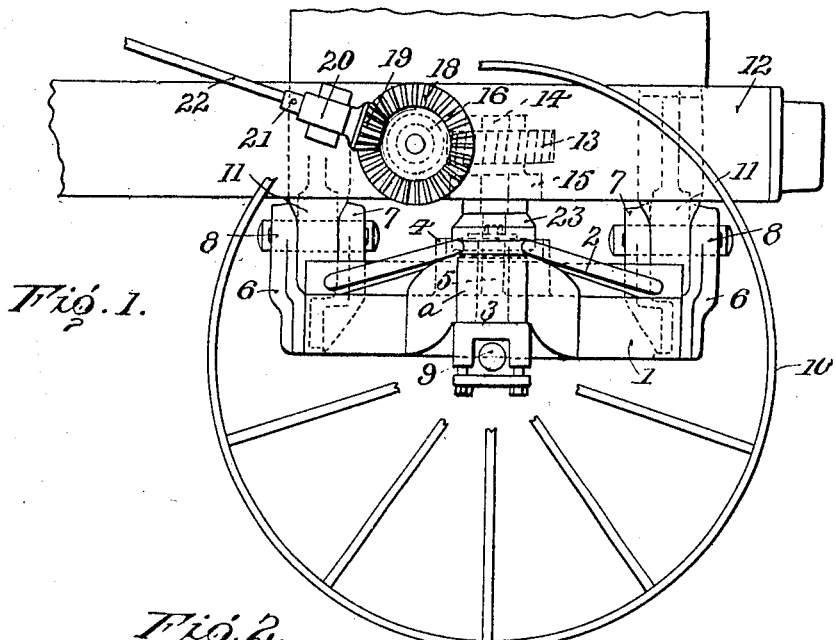
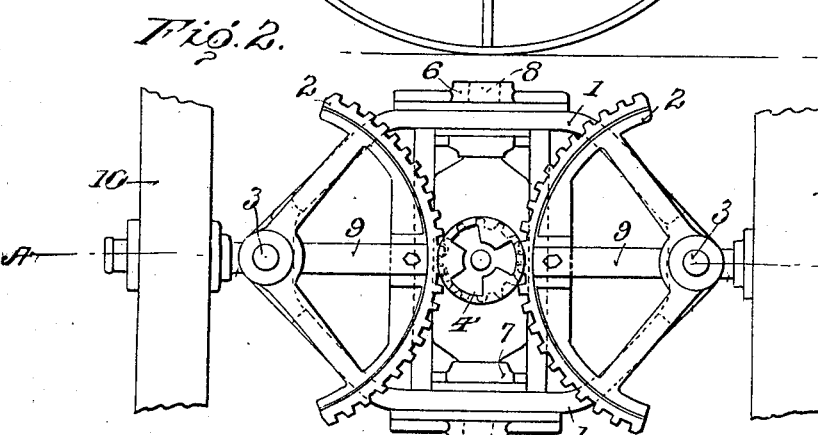
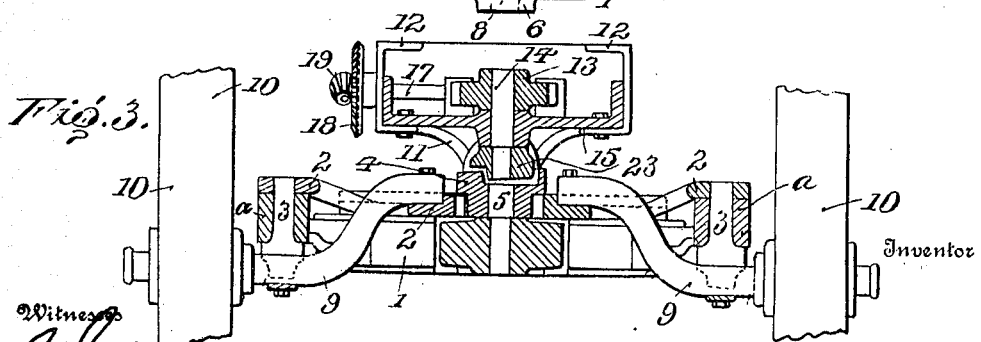

F. T. FLINCHBAUGH.
STEERING GEAR FOR TRACTION ENGINES.
APPLICATION FILED SEPT. 28, 1908.
920,125.
Patented May 4, 1909.
2 SHEETS—SHEET 2.
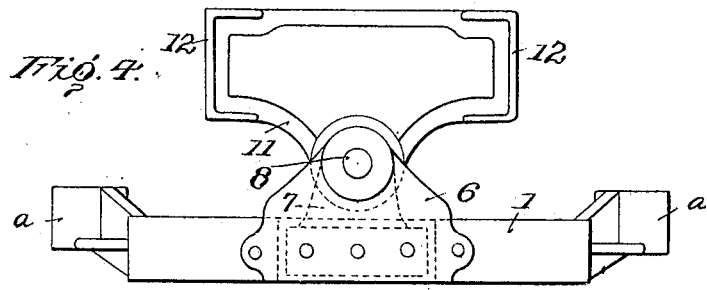
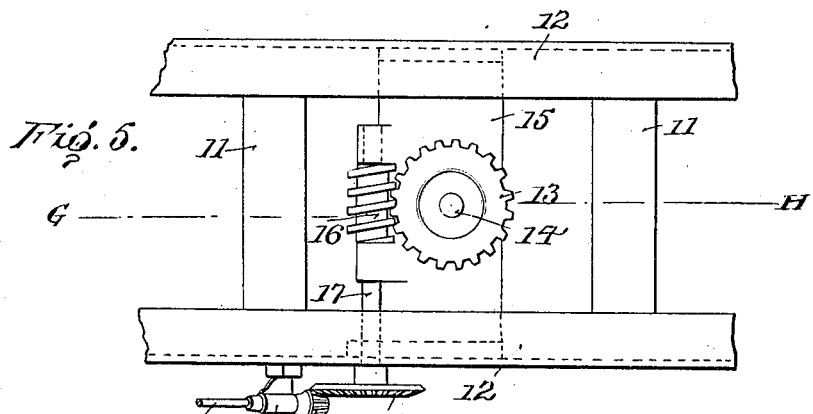
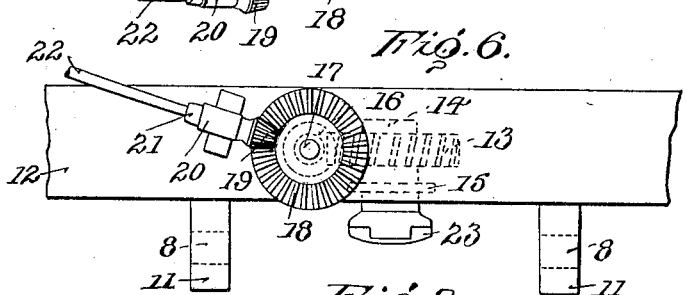
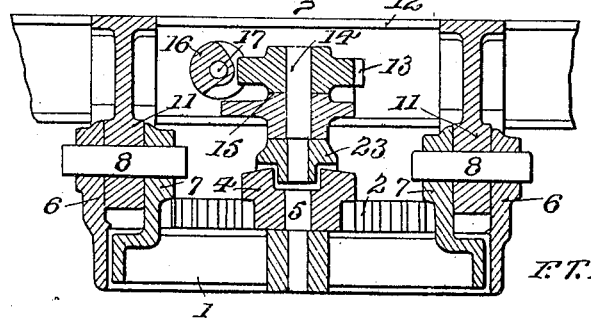
Inventor
F. T. Flinchbaugh

UNITED STATES PATENT OFFICE.

FREDERICK T. FLINCHBAUGH, OF YORK, PENNSYLVANIA.

STEERING-GEAR FOR TRACTION-ENGINES.

No. 920,125.  Specification of Letters Patent.  Patented May 4, 1909.

Application filed September 28, 1908. Serial No. 455,125.

*To all whom it may concern:*

Be it known that I, FREDERICK T. FLINCHBAUGH, citizen of the United States, residing at York, in the county of York and State of Pennsylvania, have invented certain new and useful Improvements in Steering-Gear for Traction-Engines, of which the following is a specification.

This invention provides a novel form of steering gear designed more particularly for traction engines, although adapted to road machines in which the steering wheels are mounted upon independent axles and adapted to be moved in the same direction to admit of a comparatively short turn being effected.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of the forward portion of a traction engine provided with steering gear embodying the invention. Fig. 2 is a top plan view of the axle frame and parts mounted directly thereon. Fig. 3 is a section on the line A—B of Fig. 2. Fig. 4 is a front view of the axle and bolster frames stripped and pivotally connected. Fig. 5 is a top plan view of the bolster frame removed from the axle frame, showing the parts mounted directly thereon. Fig. 6 is a side view of the parts shown in Fig. 5. Fig. 7 is a longitudinal section on the line G—H of Fig. 5 of both the axle and bolster frames.

Corresponding and like parts are referred to in the following description and indicated in all the views of the drawings by the same reference characters.

The invention contemplates an axle frame 1 and a bolster frame 11, the two being pivotally connected at 8 to admit of the axle frame turning about a longitudinal axis, thereby adapting the steering wheels 10 to the surface over which the engine or machine may be traveling, without producing strain upon the coöperating parts and their mountings. The axle frame is tapered at opposite ends, as clearly indicated in Fig. 2, and is provided at its extremities with vertical sleeves $a$ in which are mounted vertical journals 3 of the axles. A pair of ears 6 and 7 are provided medially of each transverse bar of the axle frame and extend vertically and embrace opposite sides of pendent portions of the bolster frame 11, the several overlapped parts being apertured in coincident relation to receive pivot fastenings 8 which aline longitudinally and form the axis about which the axle frame oscillates.

There are two axles 9, similar in construction and upon which are mounted the steering wheels 10, said axles being provided with vertical spindles 3 which extend within the adjacent sleeves $a$ and which form pivots for said axles. A toothed segment 2 is formed with or connected to each spindle 3 and also to the inner end of each axle 9, said toothed segments being adapted to mesh with a pinion 4, having a spindle 5 which is mounted in a center bar or plate forming a part of the axle frame 1. As the pinion 4 is turned, the axles upon opposite sides are correspondingly turned about the vertical spindles 3, thereby turning the steering wheels 10 to properly direct the machine or part to which the invention may be applied.

The bolster frame comprises yoke parts to which the forward ends of the longitudinal bars 12 of the engine frame are attached. The bolster frame comprises longitudinally spaced parts, as indicated most clearly in Fig. 5, said parts being connected by the bars 12 and having pendent portions pivoted to the pairs of spaced ears 6 and 7. A plate 15 is firmly connected at its ends to the longitudinal bars 12 and is provided at a central point with a vertical opening in which a shaft 14 is mounted and with lugs in which a transverse shaft 17 is mounted, said shaft projecting beyond one of the longitudinal bars 12 and provided with a gear wheel 18 which is in mesh with a pinion 19 at the lower front end of the steering shaft 22 which extends within convenient reach of the operator. A worm gear 13 is fast to the upper end of the vertical shaft 14 and meshes with a worm 16 fast to the inner end of shaft 17. The lower end of the shaft 14 is provided with a clutch member 23 which is in engagement with a companion clutch member forming a part of the pinion 4. The clutch members are at all times in interlocking engagement, but have ample relative play to admit of the axle frame oscillating according as the wheels 10 rise and fall in adapting themselves to the condition of the road or other surface over which the machine may be traveling. The joint between the clutch members is in line with the pivot connections 8 or the axis about which the axle frame oscillates, thereby obviating binding or clamping of the parts of the clutch when in operation.

It is to be understood that the bolster frame is fixed with reference to the main frame of the engine or other machine equipped with the invention and that the axle frame is mounted to have a limited oscillatory movement to admit of one wheel dropping into a rut or depression or passing over an obstruction without straining the parts or crippling the running gear. The steering is effected by means of the shaft 22 which may be turned either to the right or to the left according to the direction to be traversed. By having the parts arranged in the manner set forth, a substantial structure is provided and the steering may be positively effected by intermeshing gearing, thereby obviating any appreciable lost motion, such as commonly experienced when a cable or chain is employed for transmitting power from the steering shaft to the steering wheels.

Having thus described the invention, what is claimed as new is:

1. In steering mechanism of the character described, the combination of relatively upper and lower frames pivotally connected, axles mounted upon the lower frame pivotally connected, axles mounted upon the lower frame and provided with steering wheels at their outer ends and with toothed segments at their inner ends, a pinion mounted upon the lower frame and in mesh with said toothed segments and having a half clutch, and power transmission gearing mounted upon the upper frame and including a half clutch in mesh with the aforementioned half clutch of the pinion and having relative play to admit of the lower frame having limited oscillatory movement.

2. In steering mechanism, the combination of an axle frame provided at opposite ends with vertical sleeves, axles, provided with spindles journaled in said sleeves, a toothed segment at the inner end of each axle and carried by the spindles, and a pinion mounted centrally of the axle frame and in mesh with the toothed segments to impart movement thereto.

3. In steering mechanism of the character specified, the combination of a bolster frame, an axle frame pivotally connected to the bolster frame to admit of its having a limited oscillatory movement, axles mounted upon opposite ends of the axle frame and provided with steering wheels, toothed segments at the inner ends of the axles, a pinion mounted centrally of the axle frame and in mesh with said toothed segments, a shaft mounted vertically in the bolster frame in line with the axis of said pinion, means for imparting movement to said shaft to effect steering of the machine, and a clutch between the said shaft and pinion and comprising coöperating members having relative play to admit of free oscillatory movement of the axle frame.

4. Steering mechanism comprising the following elements in combination, namely, an axle frame provided with vertical sleeves at opposite ends, axles provided with spindles journaled in said sleeves, wheels mounted upon the axles, toothed segments at the inner ends of the axles and operatively connected with the spindles, a pinion mounted upon the axle frame and in mesh with said toothed segments and provided with a half clutch, a bolster frame, means pivotally connecting the axle frame with the bolster frame to admit of the axle frame having free oscillatory movement, a shaft journaled in the bolster frame, a clutch member carried by said shaft and in mesh with the clutch member of the aforesaid pinion, the two clutch members having relative play to admit of the axle frame oscillating, a worm gear fitted to said shaft, a transverse shaft having a worm thread in mesh with the worm gear, and a steering shaft geared to the shaft provided with the worm gear.

In testimony whereof I affix my signature in presence of two witnesses.

FREDERICK T. FLINCHBAUGH. [L. S.]

Witnesses:
G. ROSS BOND,
JOHN E. ECK.